United States Patent [19]

Hansen

[11] Patent Number: 5,707,463
[45] Date of Patent: Jan. 13, 1998

[54] ADJUSTABLE STUDDED TIRE SYSTEM FOR OPERATION DURING THE COURSE OF DRIVING

[76] Inventor: Iver Hansen, N-3442, Hyggen, Norway

[21] Appl. No.: 481,507
[22] PCT Filed: Jan. 21, 1994
[86] PCT No.: PCT/NO94/00019
  § 371 Date: Jul. 20, 1995
  § 102(e) Date: Jul. 20, 1995
[87] PCT Pub. No.: WO94/16913
  PCT Pub. Date: Aug. 4, 1994

[30] Foreign Application Priority Data

Jan. 21, 1993 [NO] Norway ................ 922913
Jan. 22, 1993 [NO] Norway ................ 922913

[51] Int. Cl.⁶ ........................................ B60C 11/16
[52] U.S. Cl. ................................ 152/210; 152/208
[58] Field of Search .................. 152/210, 208; 29/815

[56] References Cited

U.S. PATENT DOCUMENTS

| | | | |
|---|---|---|---|
| 2,704,564 | 3/1955 | Christensen | 152/210 |
| 3,179,146 | 4/1965 | Edsmar | 152/210 |
| 3,220,455 | 11/1965 | Sowko | 152/210 |
| 3,258,835 | 7/1966 | Boggild et al. | 29/815 |
| 3,385,742 | 5/1968 | Pettersson | 29/815 |
| 3,837,386 | 9/1974 | Lejeune | 152/210 |
| 4,838,329 | 6/1989 | Ohuchi et al. | 152/210 |
| 4,919,180 | 4/1990 | Lindén | 152/210 |
| 4,919,181 | 4/1990 | Linden et al. | 152/210 |

FOREIGN PATENT DOCUMENTS

| | | |
|---|---|---|
| 2104877 | 9/1972 | Germany . |
| 2164996 | 7/1973 | Germany . |
| 2208166 | 8/1973 | Germany . |
| 2602544 | 7/1976 | Germany . |
| 60-139505 | 7/1985 | Japan . |
| 63-315309 | 12/1988 | Japan . |
| 1-22603 | 1/1989 | Japan . |
| 7-117418 | 5/1995 | Japan . |
| 7-232518 | 9/1995 | Japan . |
| 131970 | 5/1975 | Norway . |
| 871224 | 3/1987 | Norway . |

*Primary Examiner*—Michael W. Ball
*Assistant Examiner*—Francis J. Lorin
*Attorney, Agent, or Firm*—Oblon, Spivak, McClelland, Maier & Neustadt, P.C.

[57] ABSTRACT

Adjustable studded tire system for operation while driving or parking. The system includes a hydraulic pump unit which by elastic tubes molded into the outer layer of the vehicle tire can move studs into and out of the vehicle tire without having any part of the stud system penetrate the tire casing.

19 Claims, 11 Drawing Sheets

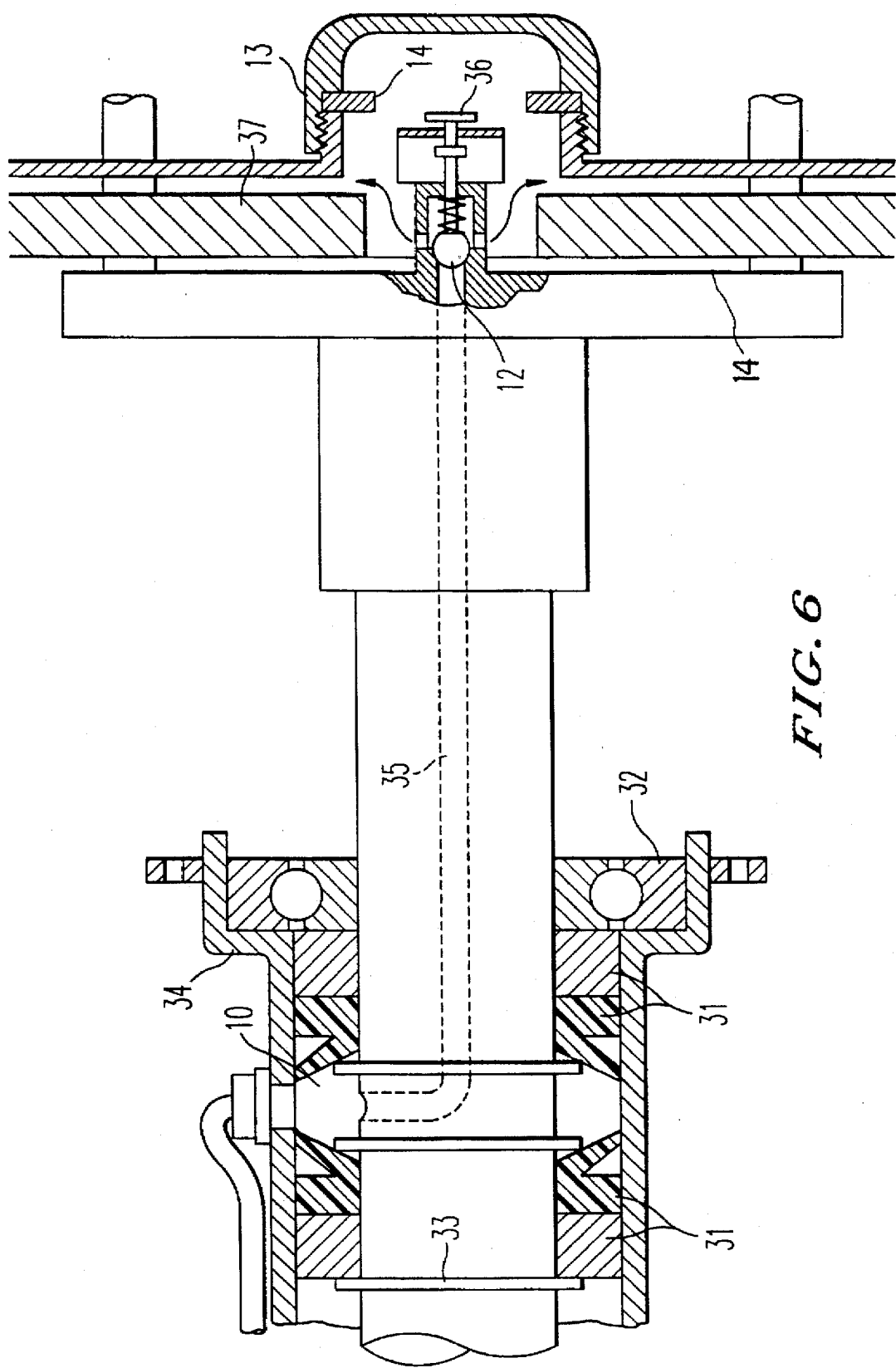

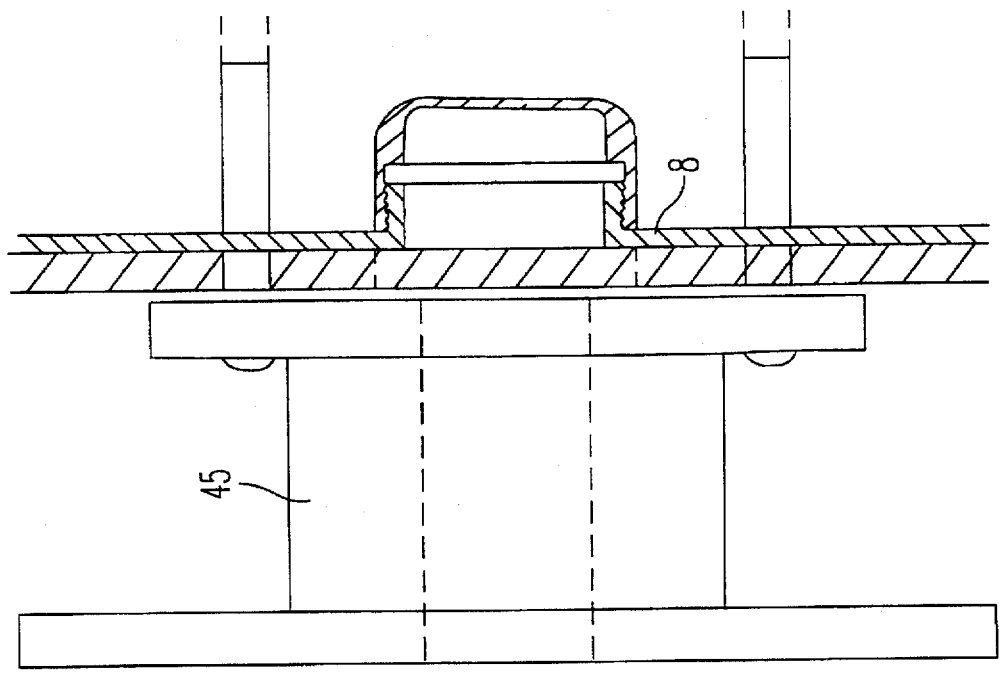
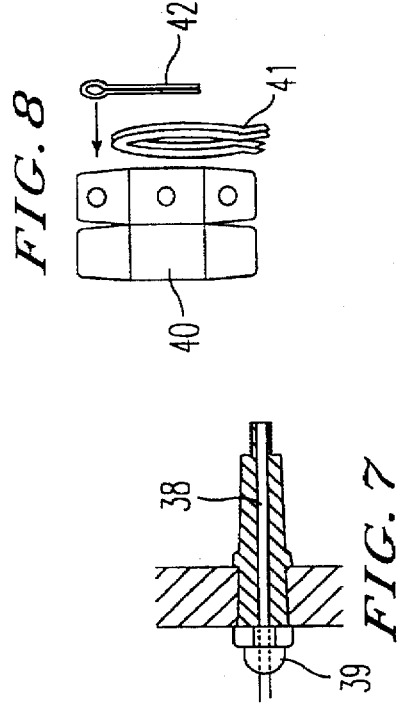
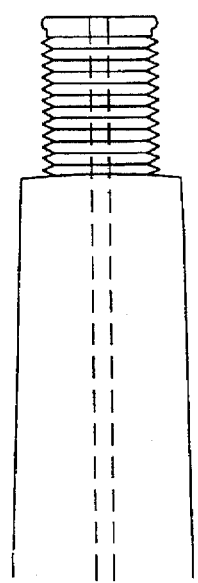
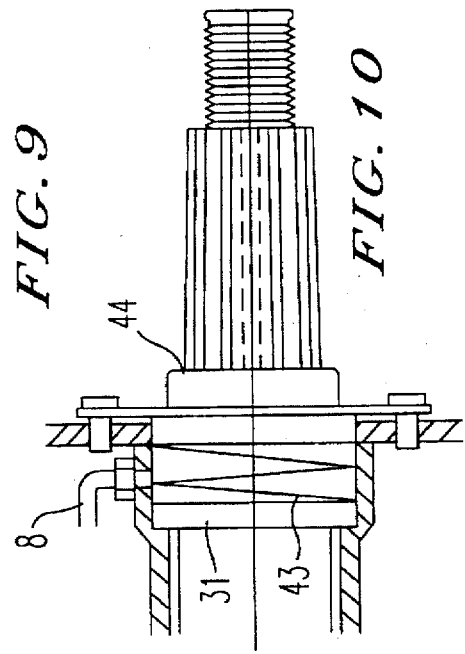

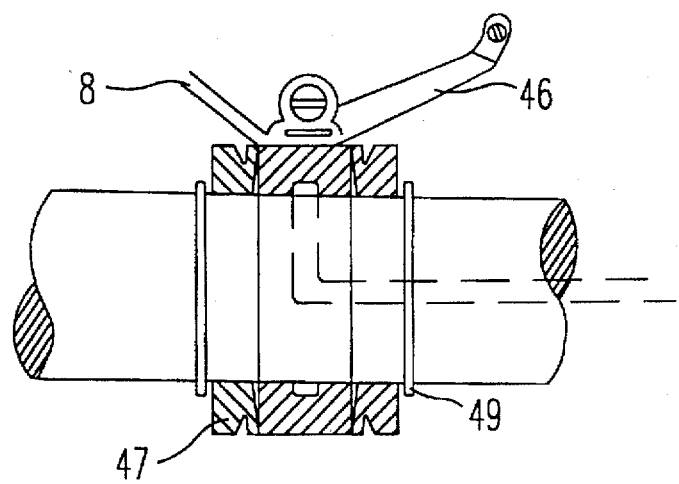
FIG. 12
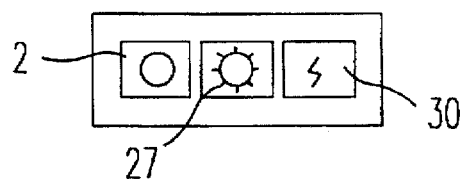
FIG. 13
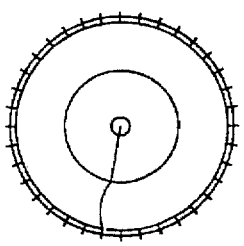 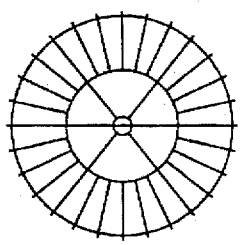 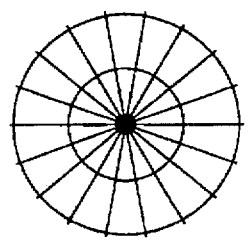
FIG. 14  FIG. 15  FIG. 16
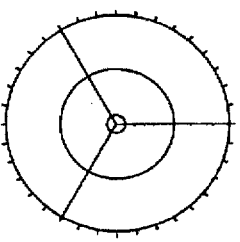 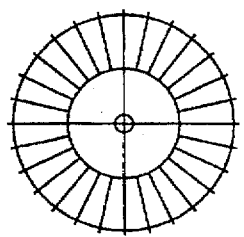 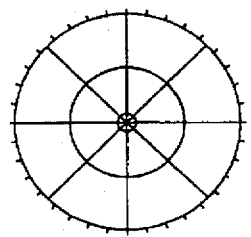
FIG. 17  FIG. 18  FIG. 19

ADJUSTABLE STUDDED TIRE SYSTEM FOR OPERATION DURING THE COURSE OF DRIVING

BACKGROUND OF THE INVENTION

1. Field of the Invention

The present invention relates to a movable tire stud system that allows adjustability of tire studs while a vehicle is either in motion or parked to quickly help solve the problems related to driving on slippery and icy roads.

2. Discussion of the Background

Many attempts have been made to solve these problems. Most systems do not function properly over long periods due to the considerable wear and tear the studding equipment must endure during the course of driving. Some adjustable studding systems require air pressure to move studs in and out. Unfortunately, such systems functional inefficiently. When the studs are pressed against road surfaces, the air tends to compress, thus the studs are forced back down into the tires. A similar effect of insufficient pressure is seen when air is entering vehicle brake system hoses. Other systems requires studs to penetrate the tire casing. This is considered by professionals to be quite unacceptable in the long run due to the heavy friction, wear, and tear leading to air leakage and humidity penetrating into the tire causing steel belt corrosion and thus tire separation within a short period of time. Other known systems of movable studs are useless because the studs are either too big, too complicated, expensive, or they consist of components that are vulnerable to sandy water, frost, shocks, etc. and consequently become easily damaged, jammed, or worn too quickly.

Norwegian patent application #861224 shows an arrangement of studs and consists of a movable wall which combined with the inner wall of the tire forms an air chamber. Consequently, the above mentioned problems are not solved in that system because it is based on air and requires penetration of the tire casing. German laid-open application #2602544 and #1680491 and U.S. Pat. Nos. 3,766,956, 3,340,921, and 3,095,918 are likewise either based on the use of air or penetration of the tire casing thus leaving the above mentioned problems unsolved. Besides, such movable stud types often need much space. Moreover, when placing movable studs under or in the tire tread, a considerable tread thickness is normally required. Thick tread tends to cause tire heating and consequently reduced driving quality.

Norwegian laid-open publication #131970 also shows a system of movable studs based on air pressure and has all the disadvantages mentioned above. Furthermore, such a system of hoses rotating inside the tire at a high speed increases the danger of explosion (flat tire). Moreover, a flat tire will probably also damage this studded system.

U.S. Pat. No. 2,941,566 uses fluid to move the studs, but requires penetration of the tire casing thus leaving the above mentioned problems unsolved.

SUMMARY OF THE INVENTION

Experiments confirm that the stud system mentioned herein has several advantages. First, it is more durable than the air systems of the cited publications because of the combination of stud jacks mounted in the shoulder of the unsiped tread blocks and the construction of the system being similar to a vehicle's brake system. When pressing the brake pedal, the piston in the brake cylinder is forced against the brake shoes. In the present invention, the tire studs are pressed against the road surface by an equivalent force. Another advantage is that thick hydraulic fluid or brake fluid is less likely to leak as compared to air systems. Hydraulic jacks were also considered when designing studs for varying conditions (FIGS. 20–28). The studs are in other words mini jacks which by the use of valves 12 (FIG. 3) may be pumped out and remain in a protruding position until a return valve 1 (FIG. 1) or O-switch 2 (FIG. 13) is operated from the dashboard. Adjustment of the studs can also be made possible in a simple, manual fashion via a handle 3 (FIG. 5).

Different from the above cited publications, the studs of the present invention are mounted in extra large, unsiped shoulder blocks 4 (FIG. 2) of the tread without penetrating the tire casing. Studs may also be mounted elsewhere on the tire tread if allowed by the tire dimensions, for instance on truck tires. Regarding this system for smaller vehicles, few tires have shoulder blocks of the tread of the necessary dimension. However, it is possible to produce such tires. Some rugged terrain tires (FIG. 2) have sufficient tread thickness for mounting small movable studs without penetration of the tire casing. Adaptability of the stud system may be improved through further development.

Ice can be removed by a heating wire 5 (FIG. 3) which can be molded into the tire together with the hydraulic tube (optional). Air can be removed from the hydraulic tube by means of a valve at the end of the tube located on the outside of the wheel of the rim 6 (FIG. 2). Practically speaking, a functioning system of movable studs is required infrequently. This system gives vehicle owners the convenience of not having to change tires every autumn and spring or use chains. While traditional studding systems are in use the whole winter season and are quickly worn out, movable studs while stay sharper because they are not used as often. Sharper studs means better traffic safety. Studs being used continuously throughout the winter season also means enormous extra expenses for road maintenance as well as increased air pollution. Because stationary studs are used throughout the winter season, they must be smaller than movable studs to reduce wear on roads. Consequently, professionals point out that movable studs may protrude more than traditional stationary studs, thereby reducing the braking distance on icy roads considerably, especially compared to tires without studs. There is generally no better alternative than using tires with good studs when driving on newly fallen snow on icy roads.

Consequently, there is an obvious need for the movable stud system as presented herein. The need is met by making available a stud system of the type precisely defined in the appended patent claims.

DESCRIPTION OF THE DRAWINGS

The stud system in accordance with the present invention is hereby described more closely by referring to exemplary embodiments thereof and with reference to the enclosed drawings wherein.

The hydraulic tube 8 goes from the valve 12 to the edge of the rim and then into the side of the tire. The tube, molded into the outer rubber layer of the tire, is passing so close to the pressure chambers 20 of the studs that it may transfer hydraulic fluid to these chambers, thereby moving the studs 21 when required.

Figure 4:
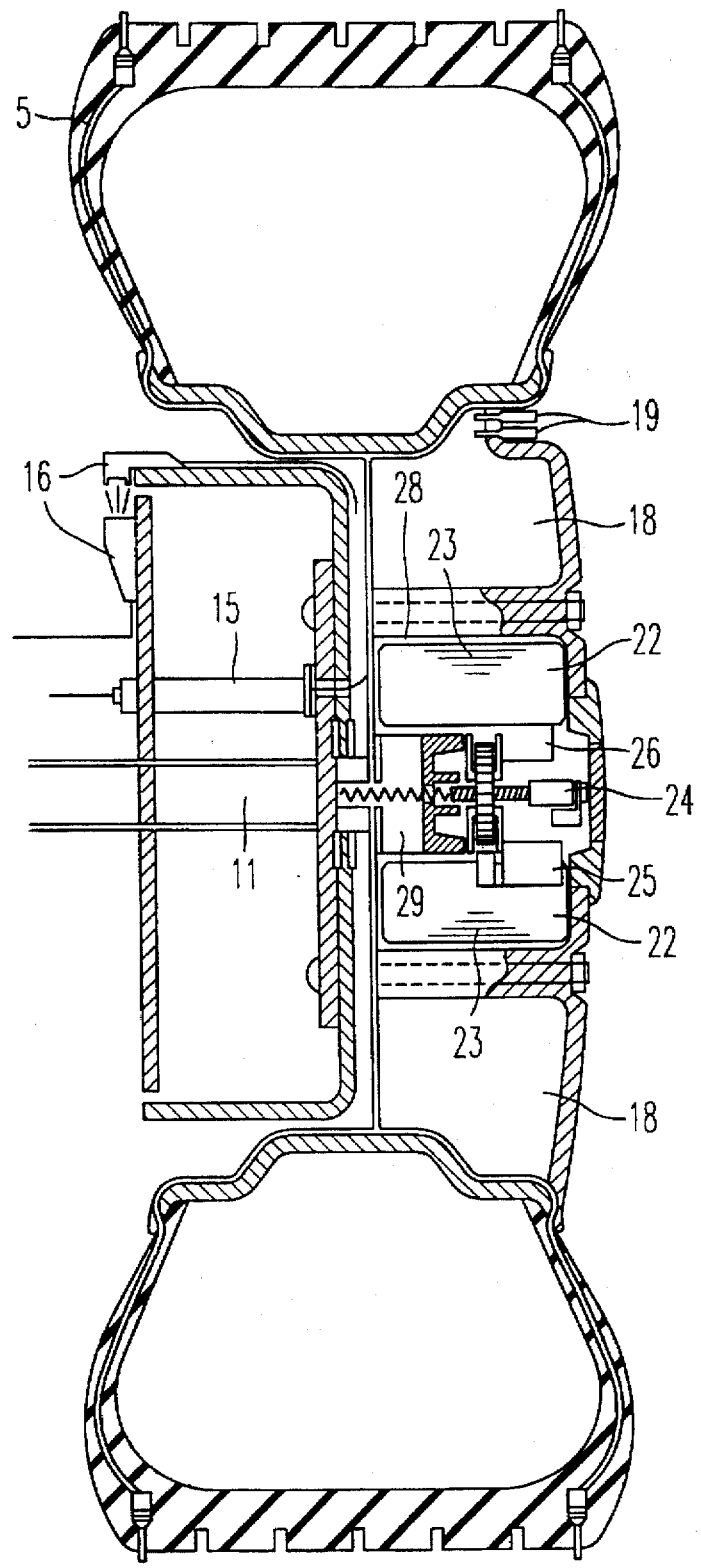

FIG. 4 shows a cross section of a wheel having rim compartments 22 for storage of hydraulic fluid. A possible air pressure in the rim compartments 18 will then be able to press a flexible wall 23 against the hydraulic fluid, thereby stabilizing it from rippling and maintaining wheel balance when driving. In the central part of the wheel there is a dynamo on which a weight has been mounted, thereby providing a pendulum dynamo 24. It delivers current to an electromotor 25 and if necessary to a battery 26. Combined with the wireless remote control 16 and switches on the dashboard (FIG. 13) it is possible to control the in/out positions of the movable tire studs. When the driver pushes the "Stud Out" switch 27 (FIG. 13) on the dashboard, a signal is sent by the wireless remote control to the electromotor, making it rotate and thereby screw the piston 28 against the pressure chamber 29. In this manner the hydraulic fluid is pressed into the stud jacks, moving the studs to an extended position. If the system does not function satisfactorily due to frost, the driver may press the defrost switch 30 (FIG. 13) on the dashboard making a heating wire along the hydraulic tube remove the ice. When studs are no longer needed, the switch for "Studs in" 2 (FIG. 13) is pressed. Preferably, a source of incompressible hydraulic fluid is incorporated in the wheel rim of the tire, having a pressure chamber of a hydraulic pump positioned centrally in the wheel rim to counteract imbalance. The source of incompressible hydraulic fluid may be located inside the vehicle body and connected with hydraulic fluid conduits through a rotatable hydraulic union and a hydraulic fluid line along the central axis of a shaft for the wheel rim on which the tire is mounted.

Figure 5:
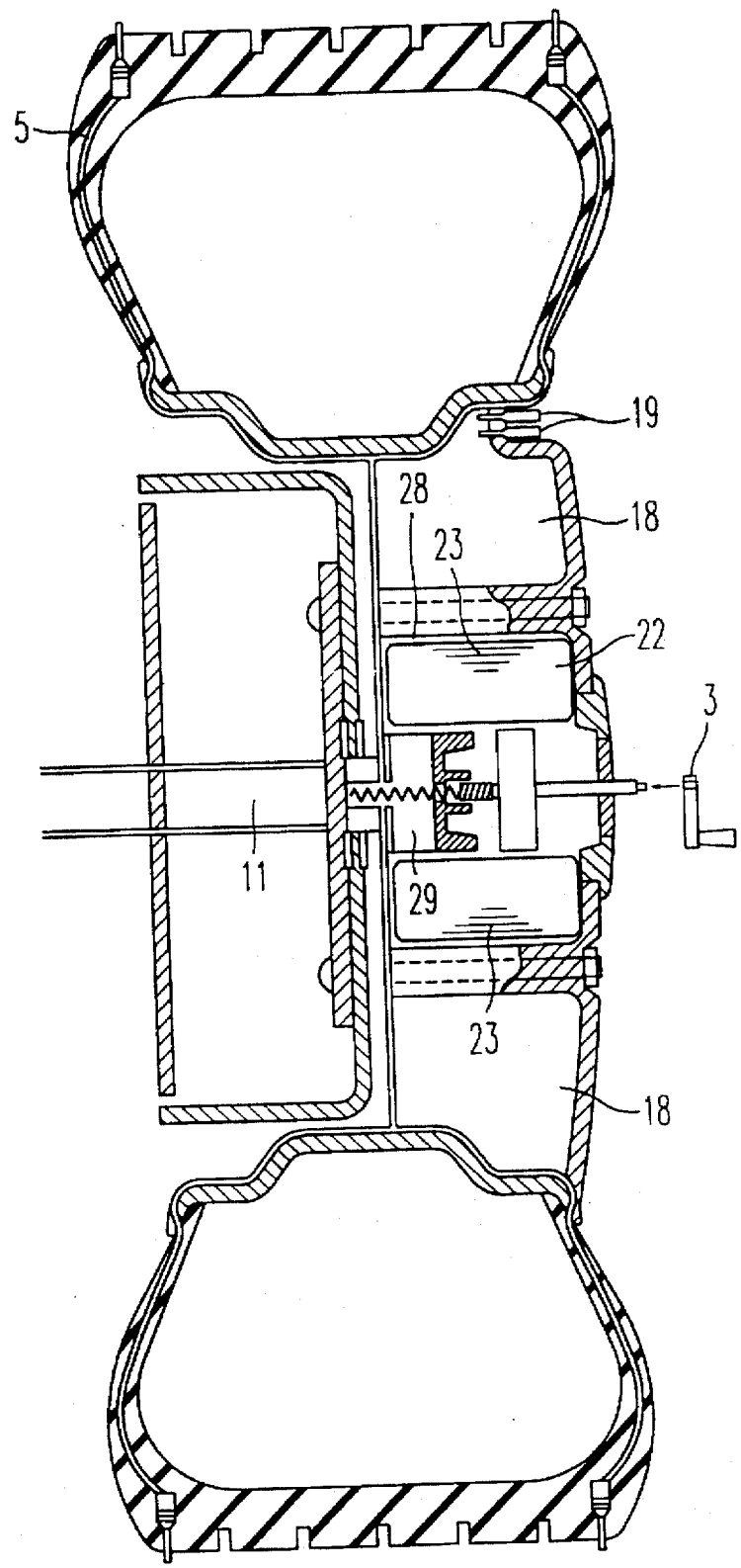

FIG. 5 shows a cross section of the wheel having a less expensive and simpler manual stud system where a handle is used instead of electromotor, remote control, etc. Piston, pressure chamber and hydraulic fluid are situated like in FIG. 4. If desired, only hydraulic fluid is in the pressure chamber 29 and only air is in the other rim compartments.

Figure 3:
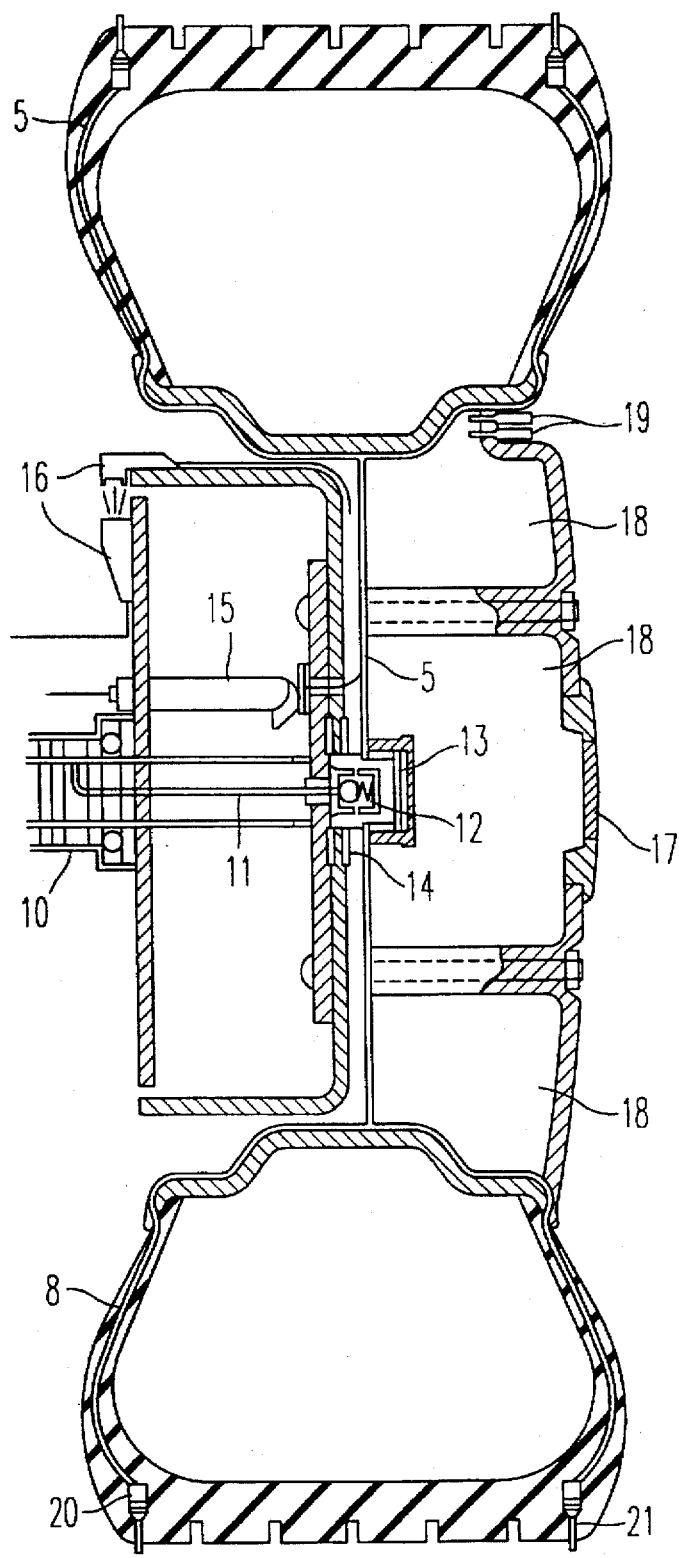
FIG. 3 shows a cross section of the wheel with a rotating union 10 conducting the hydraulic oil into a tube or a hole/channel drilled in the axle center 11, through to the valve 12 under the hub cap 13. Gaskets 14 prevent leakage of hydraulic fluid. A metal spring 15 pressed against the inside of the brake drum may transfer electric current from the vehicle battery to a heating wire 5 in or by the hydraulic tube or to other parts requiring supply of electric current. Wireless remote control 16 may be used for the above mentioned parts if desired. Inside the rim cap 17 which may have a rubber gasket, there are air tight compartments 18 with the ability to withstand the air pressure needed for storage of air reserves for the tires. Filling or transfer of air from the rim to the tire may be done through several valves 19.

FIG. 6 shows a more detailed drawing of the axle part seen in FIG. 3 with a rotating union 10 (FIG. 3). Gasket rings 31 enclose the tight compartment where hydraulic fluid is transferred to a rotating axle center. These gaskets may so called V-Rings, radial tightening or the like. Next to these gaskets is a ball bearing or roller bearing 32 and/or lock rings 33 may be mounted. These parts are placed in an axle casing 34. The hydraulic fluid in the center of the axle shaft 35 may be kept in place without leakage when mounting or dismounting wheels by using the valve handle 36 to press the valve in a locked position. When using the stud system, the handle is normally turned and pulled out to keep the valve open. The valve 12 may be either of the manual type previously described or for instance a remote control return/ magnet valve. Between the wheel rim 37 and the axle part 35 and possibly other nearby parts like for instance the wheel drum, gaskets 14 may be used to prevent leakage of hydraulic fluid. Likewise, under the hub cap 13.

FIG. 7 shows a simple type of wheel axle which normally is not a driving axle. No rotating union is needed here. Instead, a hole is simply drilled in the axle center 38 and an attachment 39 for the hydraulic tube.

FIG. 8 shows nuts 40, lock disc 41 and split pin 42 to be mounted on the axle (FIG. 9).

FIG. 9 is an enlargement of FIG. 7.

FIG. 10 shows a type of axle shaft requiring a rotating union. The hydraulic tube 8 conducts the fluid to a chamber where gasket rings 31 are kept in the right position by a spring 43. The latter gaskets are rotating with the axle and may be of the so-called V-Ring type, radial gaskets, or the like. A non-rotating gasket 44 lies next to the above mentioned gaskets and is kept in place by screws and nuts or a lock disk. Moreover, grease and oil may be used for tightening and lubrication of the parts of this stud system.

FIG. 11 shows the part of the wheel 45 normally used for disc brakes and which mount on the axle (FIG. 9). The hydraulic tube 8 may also continue directly into the rim without passing through a valve, but that will probably cause more leakage of hydraulic fluid, for instance when mounting and dismounting wheels.

FIG. 12 shows a simple rotating union to be used where the axle does not have a casing. An attachment 45 keeps a non-rotating ring 47 in place. The hydraulic tube 8 goes through the ring. Two locking rings 49 keep two so-called V-rings or radial gaskets pressed against the non-rotating ring. The V-rings enclose the axle tightly and thus rotate with it. Possibly, this rotating union may be encapsulated as protection and possibly to keep grease or lubrication in place around the rings.

FIG. 13 is an example of dashboard switches to be used for the hydraulic system illustrated in FIG. 4. The left switch is pressed when the studs are withdrawn. The middle switch is pressed when the studs are moved out to the extended position. The right switch is pressed for removing ice from the stud system.

Figure 2:
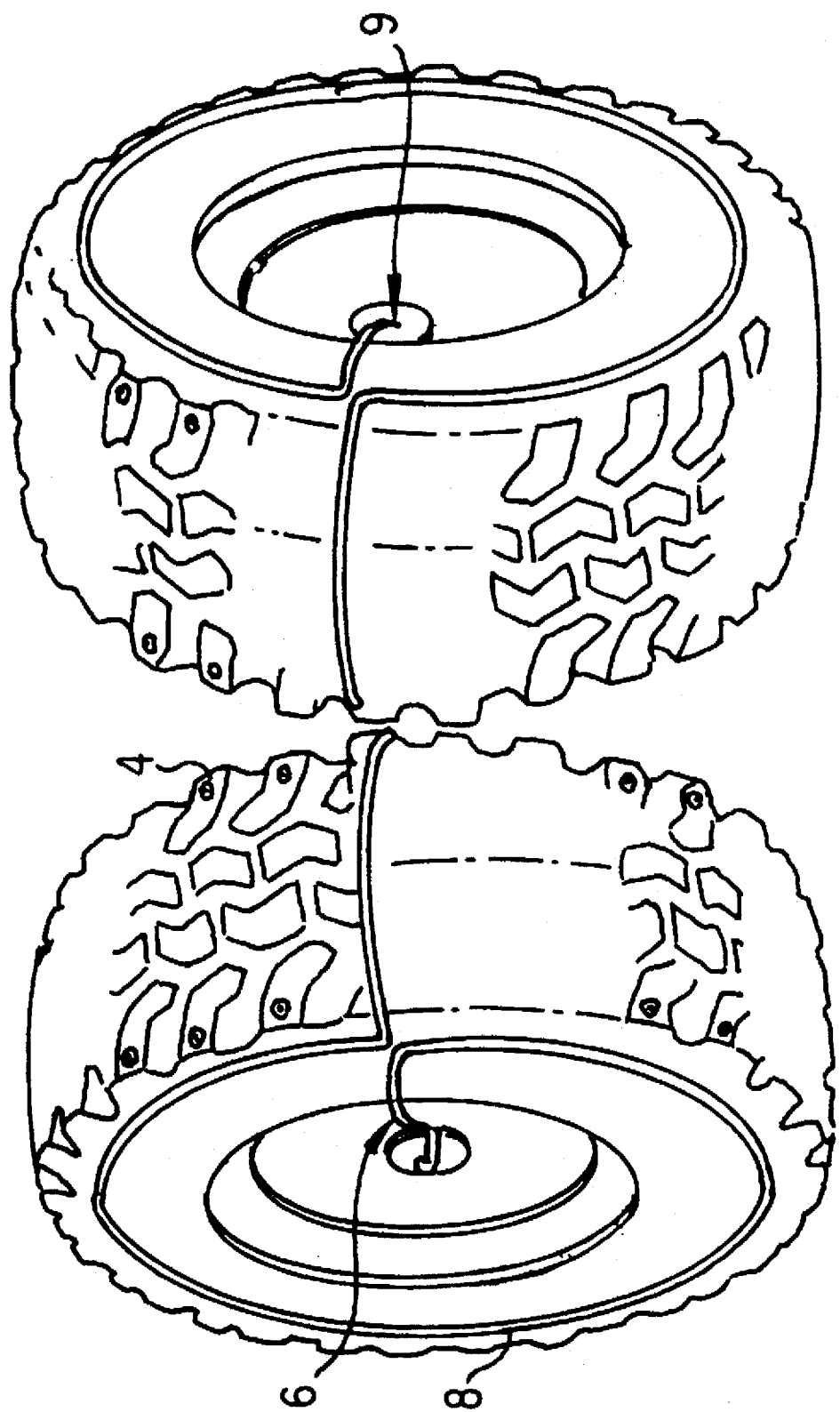
FIG. 2 shows a type of tire having rugged unsiped shoulder tread blocks suitable for this stud system. The hydraulic tube 8 is here indicated by a white line from the axle center to the rim edge on the inside of the rim 9 and further molded into the tire. The hydraulic tube may possibly cross the tire tread in one of the wear indicators, which is a thick rubber section under the tire tread. The tube will normally not penetrate the tire casing. Connection between the tube on the rim and the tire may be made where the tube is pressed against the edge of the rim. The small tube office at the edge of the tire is pressed against a small tube orifice in the rim edge when the tire is inflated. If desired, a manual coupling on the outside of the tire/rim edge may be used when it is more convenient to connect the hydraulic tubes in such a manner.

FIGS. 14–19 show six different examples of hydraulic tube branches in the wheel. FIG. 14 corresponds to the branches of FIG. 2. Exact choice of branching will depend on the actual type of tire and wheel and long term experience.

Figure 1:
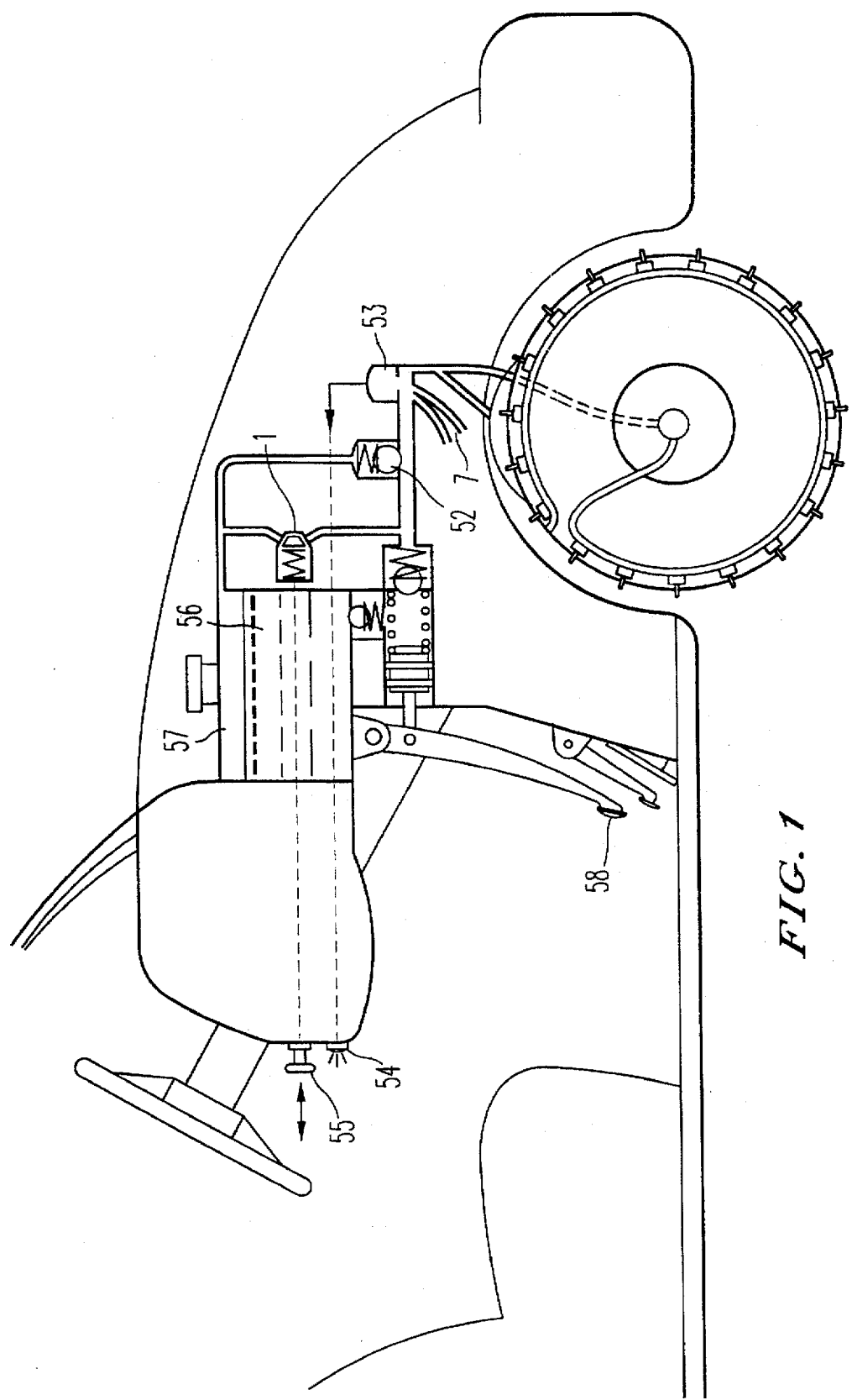
FIG. 1 shows the main part of the adjustable stud system except the branching hydraulic tubes to the rear wheels, here only partly shown for the right and left rear wheels 7.
Figure 20:
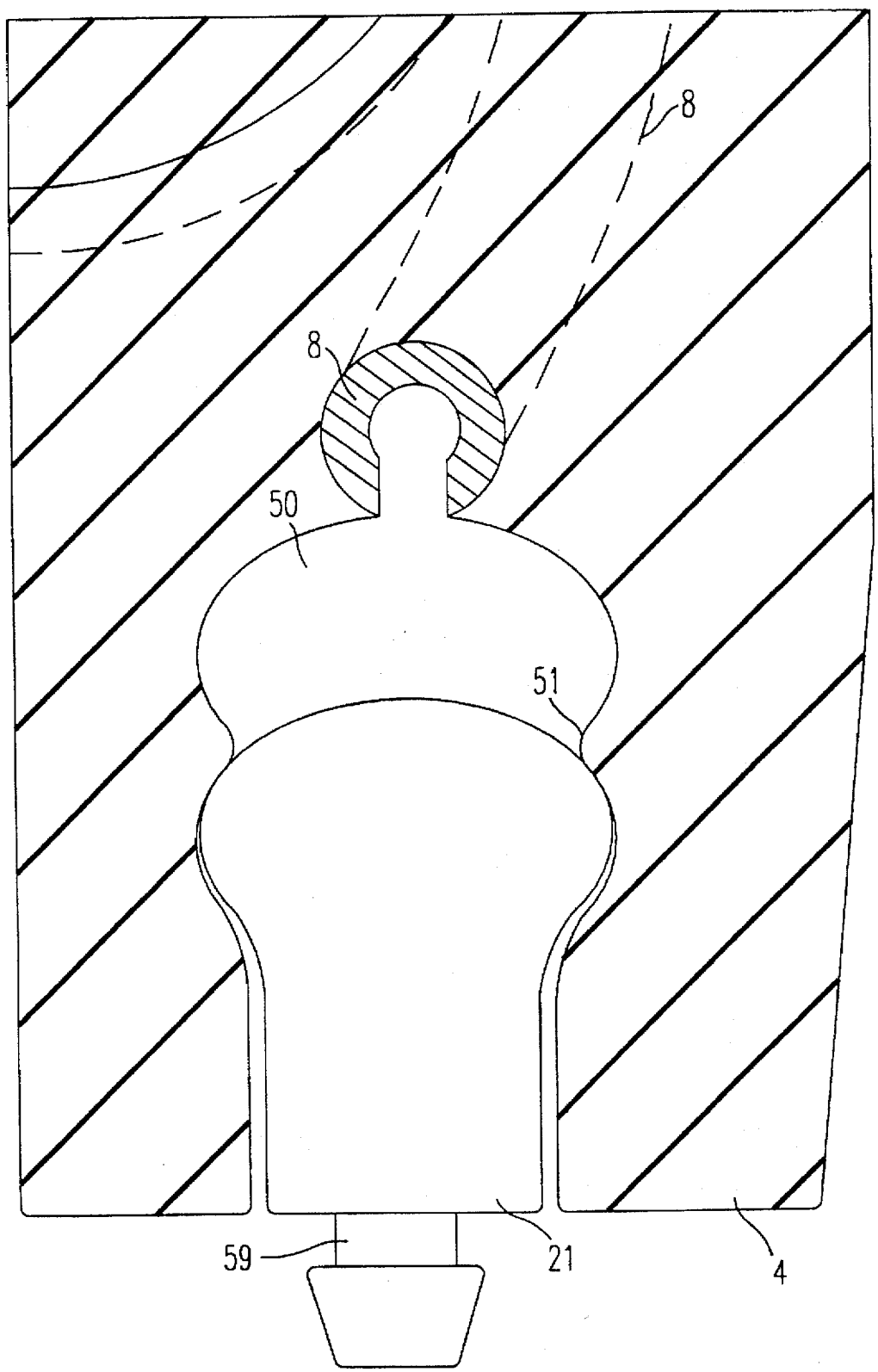
Figure 21:
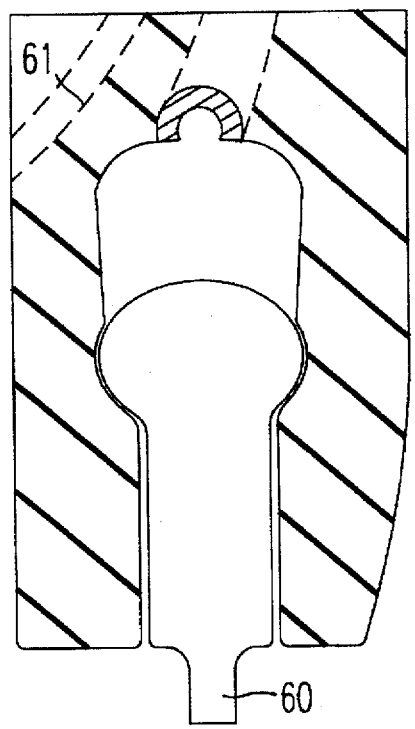

FIG. 20 shows an example of the most simple type of movable metal studs (FIG. 20 & 21). It is enclosed in an unsiped tire shoulder tread block 4 functioning both as wells of the pressure chamber 50 as well as an elastic gasket. The hydraulic tub 8 conducts hydraulic fluid into the pressure chamber thereby pressing the stud through the narrow pass 51 in the stud hole. A safety valve 52 (FIG. 1) protects the stud from being extended further than to the position illustrated in FIG. 20. When there is sufficient pressure on the studs, a pressure gauge 53 (FIG. 1) on the dashboard alerts the driver by light or other means 54 (FIG. 1). The stud is withdrawn into the tire again when the hydraulic pressure is removed. This is done by pulling a handle 55 (FIG. 1) on the dashboard or when pressing the left switch 2 (FIG. 13). As long as there is enough hydraulic fluid 56 (FIG. 1) in the hydraulic fluid reservoir 57 (FIG. 1), it is possible to increase the pressure sufficiently to move the studs out by pumping the stud pedal 58 (FIG. 1) or by use of the switch 27 (FIG. 13). Possibly, grease may be pressed onto the stud holes at regular intervals when needed. A notch or narrowed portion 59 suitable to be gripped by a tool will make it easier to pull out studs to be replaced. When the hydraulic fluid pressure is removed, the pressure from the road surface will press the studs back into the stud hole and through the narrow pass. To make this system function satisfactorily, an accurate adjustment of studs and stud holes is important. The stud having a notch or narrowed portion may be combined with a frustoconical or frustopyramidal section on the stud tip. These studs may be retained with a retaining means which is shaped as a ball-like, somewhat rounded or partly beveled enlargement or an elastic gasket enlargement, the enlargement both sealing hydraulically and facilitating the removal or mounting and replacement of the studs elastically through the outer portion of the stud holes without damaging the stud holes. In order to facilitate removal or replacement of the studs, the inner portion of the stud holes may have an elongated chamber where the chamber is suitably vaulted, preferably to about the same curvature as the ball-like enlargement, at least at the chamber and adjacent to the outer portion of the stud hole and preferably at both chamber ends, thereby assuming, for example, a shape somewhat like an oblong bulb. The chamber in the stud holes may have two cavities, each cavity fitted to the shape and size of the enlargement of the studs and interconnected by a narrow passage, the passage allowing the stud enlargement to be slipped between the cavities when actuated by a tool from the outside or by hydraulic fluid pressure or by reduced pressure from the inside of the stud hole, thereby making the studs movable between the retracted and protruding position of the stud tip. The inner portion of the stud holes may have an elongated chamber having a shape like a frustum of a cone in which the diameter of the fluid inlet is somewhat larger than the diameter at the chamber end adjacent to the outer portion of the stud hole, thereby keeping the studs in a retracted position when no fluid pressure is forcing the studs out to an extended position. The stud hole may be shaped in a sleeve of metal or springy material, e.g. Teflon, residing as a lining in an accommodating bore provided in the thick, unsiped portion of the tire shoulder tread blocks. The sleeve may have a retaining means shaped as a ball-like or rounded enlargement fitted into an inner portion of the bore to facilitate the mounting or removal and replacement of the sleeve, together with the stud residing in the stud hole of the sleeve, elastically through the outer portion of the accommodating bore without damaging the bore. The outer portion of the stud holes may have a narrow passage close to the bulb-like inner chambers, possibly in combination with a frustoconical section on the stud stem, suitable to seal the inner chambers when the studs are in a withdrawn position. The hydraulic fluid conduits may be of a somewhat larger diameter close to the pressure chambers in the stud holes, suitable to facilitate connection of the pressure chambers to the conduits.

FIG. 21 resembles FIG. 20 aside from the stud point 60 being straight. Testing will show whether this stud is useful and easily exchangeable. A reinforcement belt or ply 61 should be a few millimeters away from the stud hole to avoid damages.

Figure 22:
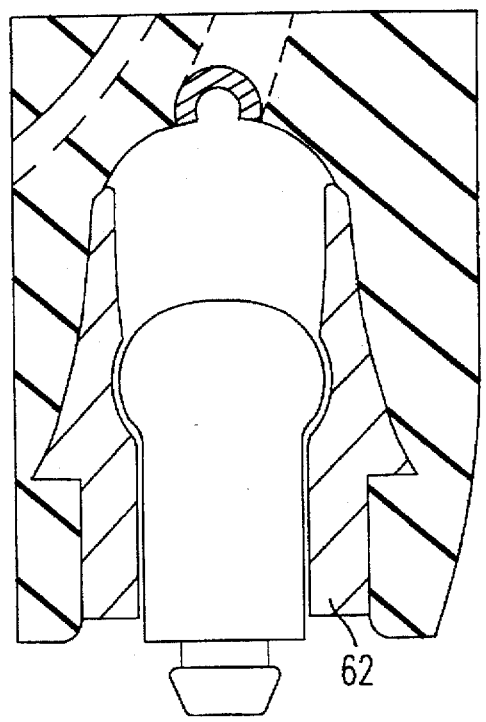

FIG. 22 shows the same type of stud as in FIG. 20 but the stud hole wall is of somewhat springy material 62, for instance Teflon, which from the outside may be worn down at the same rate as the surrounding tire tread.

Figure 23:
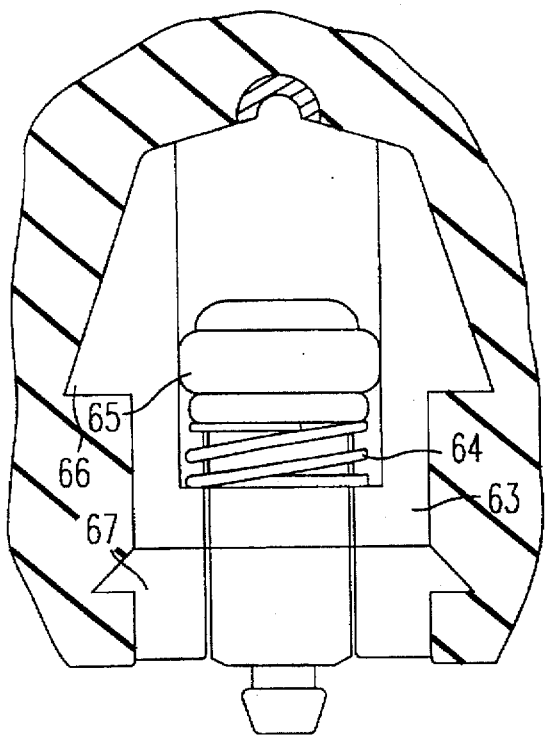

FIG. 23 shows a stud having close similarities to a small jack; a surrounding metal cylinder 63, a spring 64, and an elastic gasket 65. It is mounted into the stud hole (may be drilled). A flange 66 prevents the stud and cylinder from falling out when driving. If desired, glue or adhesive may further secure its position. The lower part may consist of a ring 67 if needed to support the tire stud against side bending, which at the same time may consist of a material that may be worn down at the same rate as the tire tread.

Figure 24:
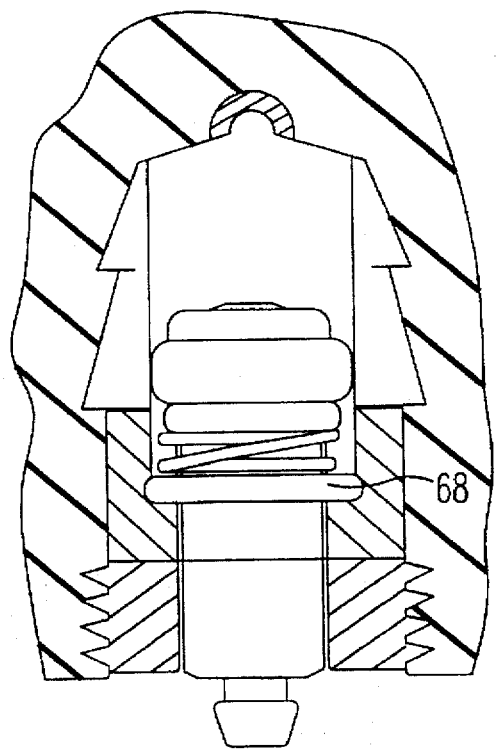

FIG. 24 shows a type of stud resembling FIG. 23, except for an elastic gasket 68 to counteract moisture, sand, etc. from the road surface. The lower ring has threads and possibly glue to secure its position if necessary.

Figure 25:
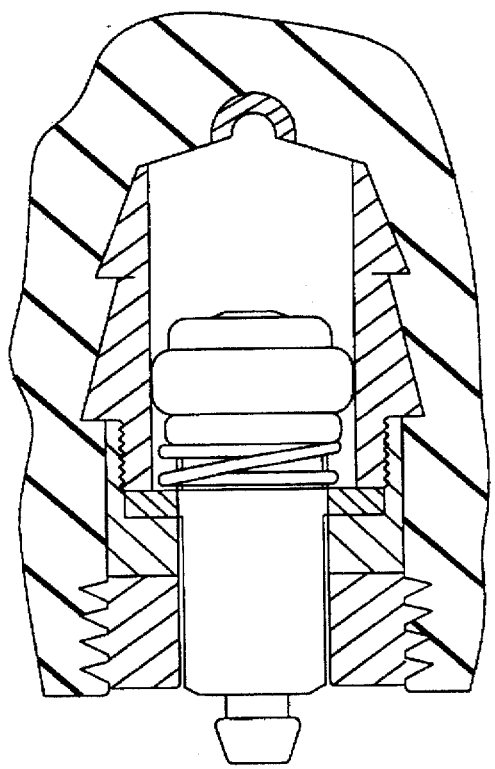

FIG. 25 shows a type of stud which may have its lower gasket screwed more tightly in place. The same applies to the upper gasket attached to the stud jack.

Figure 26:
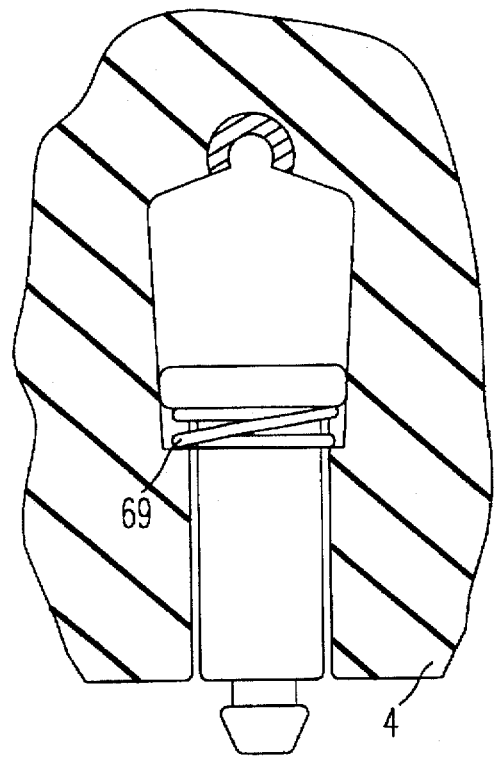

FIG. 26 shows a simple type of stud placed directly in the tire shoulder tread block 4 and a return spring 69.

Figure 27:
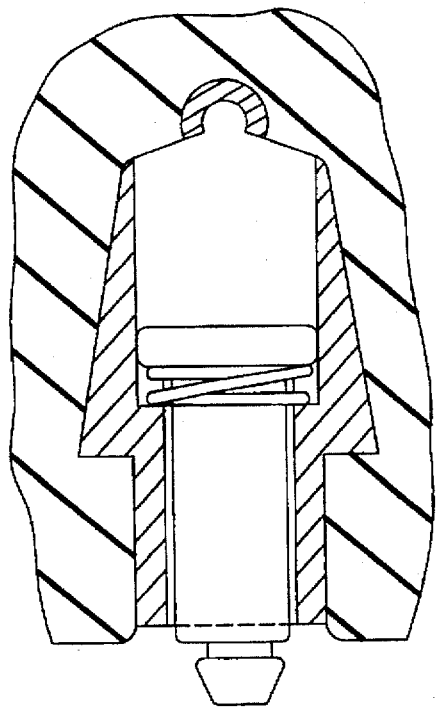

FIG. 27 shows a stud like the one in FIG. 26 but surrounded by Teflon or similar material which may be worn at the same rate as the tire tread.

Figure 28:
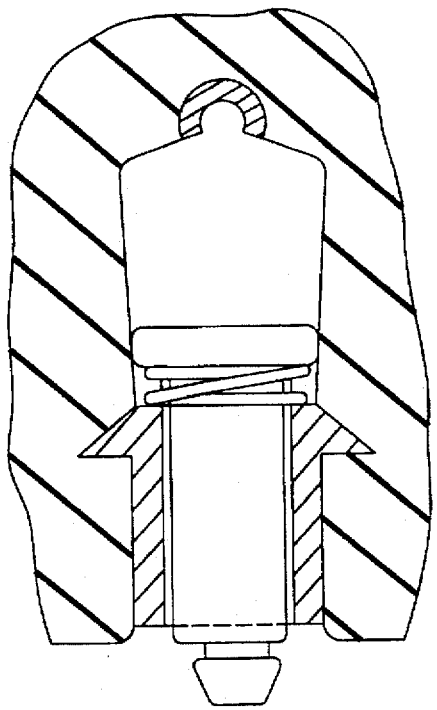

FIG. 28 shows a stud like the one in FIG. 26, however, with a support ring inserted which will be worn at the same rate as the rest of the tire tread.

The stud holes of the present stud system may be molded under production, equipping the molding matrixes with molding pins of an adequate size. For some types of studs it might be sufficient to drill a hole of a suitable diameter.

If desired, protection for the studs against humidity, sand particles, and the like is possible by means of some packing gaskets, e.g. under return springs, or by a somewhat larger stud diameter on the lower part of the stud, tightening the stud hole better when the stud is withdrawn into the stud hole/stud cylinder.

A wireless remote control 16 (FIG. 3) may also be mounted on the outside of the wheel with the signal transmitter placed just inside and on the edge of the mudguard, and the receiver on or nearby the rim cap 17 (FIG. 3). This will give easy access for regular cleaning of the components.

I claim:

1. A studded tire system having a tire mounted on a wheel rim, comprising:
    (a) stud holes located in a tire shoulder tread block of a tire, having movable studs mounted therein;
    (b) conduits for air-free, incompressible hydraulic fluid in fluid communication with the movable studs;
    (c) a hydraulic pump for air-free incompressible hydraulic fluid having a piston and a pressure chamber, the piston and pressure chamber of the pump positioned centrally in the wheel rim to counteract imbalance and vibration when driving, said pump in fluid communication with the hydraulic fluid conduits; and
    (d) a wireless remote control for activating the hydraulic pump;
    wherein action of the hydraulic pump selectively causes the studs to protrude or retract in the stud holes.

2. A studded tire system having a tire mounted on a wheel rim, comprising:

(a) stud holes located in a tire shoulder tread block of a tire; having movable studs mounted therein;

(b) conduits for air-free, incompressible hydraulic fluid in fluid communication with the movable studs; and (c) a hydraulic pump for air-free incompressible hydraulic fluid having a piston and a pressure chamber, the piston and pressure chamber of the pump positioned centrally in the wheel rim to counteract imbalance and vibration when driving, said pump in fluid communication with the hydraulic fluid conduits;

wherein action of the hydraulic pump selectively causes the studs to protrude or retract in the stud holes.

3. The tire system of claim 2, wherein the studs comprise a stud tip protrudable from the stud hole, a stud stem accommodated in an outer portion of the stud hole and a stud retaining portion accommodated in an inner portion of the stud hole.

4. The tire system of claim 3, wherein the stud tip comprises a notched or narrowed portion.

5. The tire system of claim 4, wherein the stud tip further comprises a terminal frustoconical or frustopyramidal section.

6. The tire system of claim 4, wherein the retaining portion is an enlargement of the stud, wherein the enlargement hydraulically seals the stud within the stud hole.

7. The tire system of claim 6, wherein the inner portion of the stud hole comprises an elongated chamber.

8. The tire system of claim 7, wherein the elongated chamber is vaulted having a curvature which accommodates the enlargement of the retaining portion.

9. The tire system of claim 7, wherein the elongated chamber comprises two cavities interconnected by a narrowed passage between the two cavities, wherein the enlargement is capable of passing between the two cavities so that the studs are movable between a retracted position and a protruding position of the stud tip.

10. The tire system of claim 7, wherein the elongated chamber has the shape of a frustum of a cone having a large diameter portion and a narrow diameter portion, wherein the narrow diameter portion is adjacent to the outer portion of the stud hole and the larger diameter portion is adjacent to a fluid inlet in fluid communication with the hydraulic fluid conduits.

11. The tire system of claim 2, wherein the stud hole comprises a sleeve accommodated in the tire shoulder tread block.

12. The tire system of claim 11, wherein the retaining portion is an enlargement of the stud, wherein the enlargement hydraulically seals the stud within the stud hole.

13. The tire system of claim 2, wherein the outer portion of the stud hole has a narrow passage.

14. The tire system of claim 2, further comprising a hydraulic fluid storage compartment in the wheel rim.

15. The tire system of claim 14, further comprising an air storage compartment in the wheel rim.

16. The tire system of claim 2, wherein the hydraulic pump is positioned centrally and coaxially with the center of the wheel rim.

17. The tire system of claim 16, wherein the hydraulic pump comprises a hydraulic fluid pressure chamber positioned coaxially with the center of the wheel rim and a piston positioned coaxially with the center of the wheel rim, wherein motion of the piston against the pressure chamber causes the studs to protrude or retract in the stud holes.

18. The tire system of claim 17, further comprising a handle rotatably attached to the piston for moving the piston against the pressure chamber.

19. The tire system of claim 17, further comprising an electromotor attached to the piston wherein action of the electromotor moves the piston against the pressure chamber.

* * * * *